United States Patent [19]

Curchod

[11] Patent Number: 4,635,481
[45] Date of Patent: Jan. 13, 1987

[54] LIGHT WEIGHT DYNAMIC WHEEL BALANCING MACHINE

[76] Inventor: Donald B. Curchod, 1246 Sharon Park Dr., Menlo Park, Calif. 94025

[21] Appl. No.: 657,432

[22] Filed: Oct. 3, 1984

Related U.S. Application Data

[63] Continuation-in-part of Ser. No. 395,250, Jul. 6, 1982.

[51] Int. Cl.⁴ .................................................. G01M 1/22
[52] U.S. Cl. ......................................... 73/460; 73/462
[58] Field of Search ................. 73/460, 462, 471, 475, 73/476, 487

[56] References Cited

U.S. PATENT DOCUMENTS

| | | | |
|---|---|---|---|
| 1,662,511 | 3/1928 | Geist | 474/84 |
| 2,082,540 | 6/1937 | Geare | 474/84 |
| 2,180,481 | 11/1939 | Ruau | 474/55 X |
| 2,623,397 | 12/1952 | Battersby | 474/58 |
| 3,192,775 | 7/1965 | Federn et al. | 73/460 |
| 3,435,686 | 4/1969 | Waldron | 73/460 |
| 3,566,706 | 3/1971 | Fix | 474/237 |
| 3,631,733 | 1/1972 | Thompson, Jr. | 474/255 |
| 3,813,948 | 6/1974 | Ito | 73/460 |
| 3,922,922 | 12/1975 | Goebel | 73/462 |
| 4,085,619 | 4/1978 | Shapiro et al. | 73/462 |
| 4,094,198 | 6/1979 | Moulinoux | 73/460 |
| 4,137,787 | 2/1979 | Waugh | 474/263 |
| 4,149,416 | 4/1979 | Harant | 73/462 |
| 4,352,291 | 10/1982 | Curchod et al. | 73/462 |
| 4,404,851 | 9/1983 | Curchod | 73/460 |
| 4,423,632 | 1/1984 | Madden et al. | 73/462 |
| 4,449,407 | 5/1984 | Curchod | 73/462 |

FOREIGN PATENT DOCUMENTS

| | | |
|---|---|---|
| 1535108 | 3/1976 | Fed. Rep. of Germany . |
| 2732738 | 7/1977 | Fed. Rep. of Germany . |
| 1424699 | 4/1972 | France . |
| 1554333 | 6/1976 | France . |
| 2131561 | 6/1984 | United Kingdom ................. 73/462 |

Primary Examiner—Stephen A. Kreitman
Assistant Examiner—Scott M. Oldham
Attorney, Agent, or Firm—Flehr, Hohbach, Test, Albritton & Herbert

[57] ABSTRACT

A light weight, low speed, low cost dynamic balancing machine useful for wheel balancing includes a light weight base, sensors for detecting unbalanced signals and attendant noise, and a low energy drive employing a small electric motor driving elastic belts for rotating the body to be balanced.

5 Claims, 3 Drawing Figures

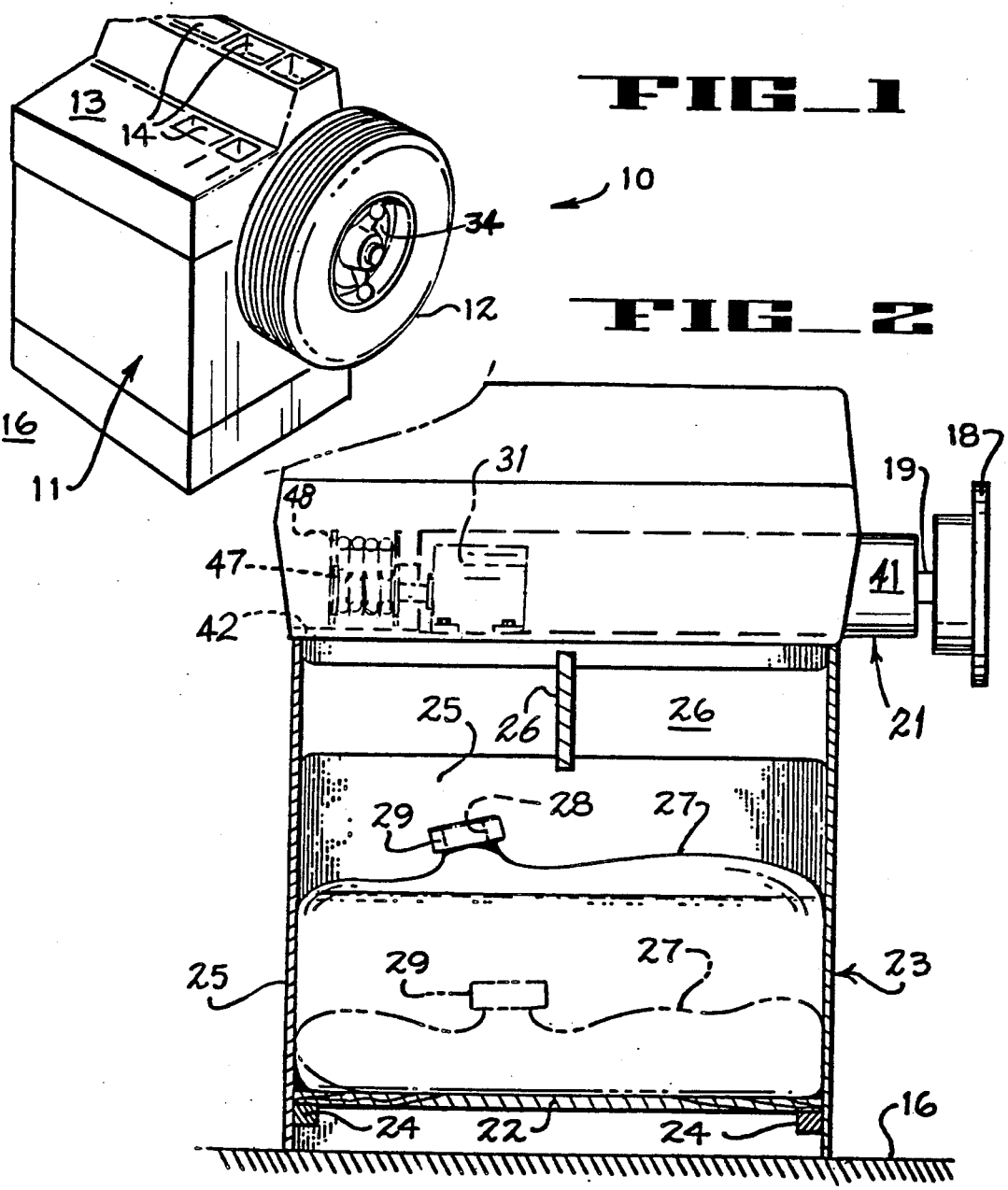

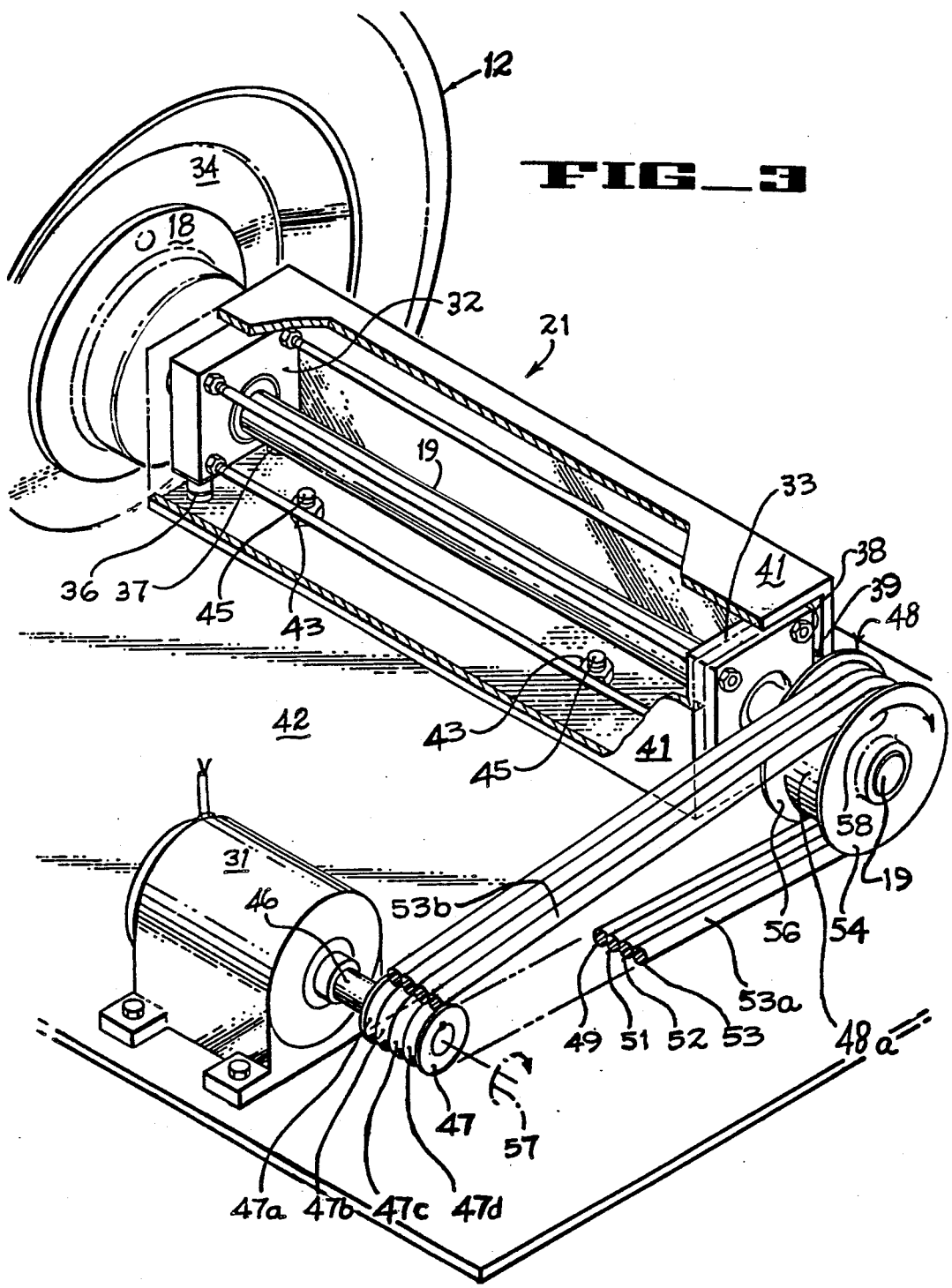

LIGHT WEIGHT DYNAMIC WHEEL BALANCING MACHINE

This is a continuation-in-part of pending application Ser. No. 395,250, filed July 6, 1982.

This invention pertains to dynamic balancing machines and more particularly to a light weight, low speed, low cost balancing machine particularly useful in balancing vehicle wheels.

Heretofore, typical dynamic wheel balancing systems have included a relatively massive base structure, a wheel carrying axle supported for rotation by the base, a relatively powerful electric drive motor of the order of one horsepower or more, and an inelastic V-belt and pulleys for rotating the axle at a high rate of speed, on the order of 500 rpm. In addition, the drive belt has been placed under tension by adjusting the spacing between the pulleys of the motor and the wheel-carrying axle or by employing belt tensioning means riding against one or both reaches of the belt. Systems of the foregoing kind further include suitable electronic sensing means responsive to the rotation of the wheel for detecting the radial location and amount of weight to be added to counterbalance unbalanced portions of the wheel and tire assembly. A safety shield usually covers the wheel in operation due to its high rotational speed.

Spurious mechanical vibrations introduce enough "noise" into these sensing systems so that in order to detect the signals representing the true unbalanced forces, it has been necessary to drive the wheel at a high speed of the order noted above.

The foregoing requisite high speed has been based on the observation that unbalanced signals from the system vary with the square of the speed of the wheel whereas the noise of a drive system of the kind described must be less than the square root of the rotational speed to maintain the necessary signal to noise ratio. These relationships, therefore, have dictated the present high rotational speeds and its related expense required by the need for a massive base, large drive motor, safety shield and excess power consumption.

Thus, there has been a need for an improved dynamic wheel balancing machine. As disclosed herein, a dynamic balancing machine has been provided wherein the rotation of the wheel and tire assembly can be substantially reduced to a relatively low and safe speed of rotation of the order of 200 rpm (i.e. approximately 40% of much present day equipment) so as to provide the following and other significant advantages.

The dynamic balancing machine disclosed uses a low power motor on the order of one-sixth horsepower rather than a one horsepower motor as now frequently employed. This reduction in the speed of rotation and energy permits the elimination of the usual safety hood which normally is located over the rotating wheel during balancing. Additionally, use of tensioning means acting against the belt drive has also been eliminated, along with its cost, thereby further reducing noise sensed in the electronics. Finally, the balancing system as disclosed herein has the advantage whereby the drive motor and supporting shaft of the wheel and tire assembly can be mounted on fixed centers at a predetermined spaced relation from each other without using tensioning means acting against the drive belt.

In short, dynamic balancing machines of the kind described have heretofore employed an inelastic belt formed with a joint therein. Use of such belts contributes to the "noise" sensed by the system. Such belts have required tensioning means acting against the belt thereby further introducing additional objectionable "noise" into the system. Thus, to achieve a signal-to-noise ratio whereby the true unbalanced signals can be clearly distinguished, the relatively high rotational speed of the order of 500 rpm has had to be employed. This, in turn, has demanded a larger motor, more massive and rigid base, and the use of a safety hood located over the high speed rotating wheel and tire assembly.

In addition, these machines are required to reach top speed very quickly and to decelerate very quickly so as to minimize the time consumed in balancing a wheel. Accordingly, the usual inelastic V-belt driven by a one horsepower motor has served to quickly accelerate and decelerate the wheel and tire assembly. However, such acceleration forces further dictate the use of a more rigid, massive and expensive base.

SUMMARY OF THE INVENTION AND OBJECTS

In general, for rotating a wheel/tire assembly to be balanced, a dynamic wheel balancing machine includes a drive shaft in which one end of the shaft is disposed and adapted to readily removably receive a wheel to be balanced. Bearing means serve to support the shaft for rotation. The drive shaft carries a pulley on one end for receiving elastic belt drive means therearound. The belt means has a smooth exterior and a modulus of elasticity sufficient to provide substantially all tensioning of the belt means when trained about and between the pulleys whereby minimal noise is generated. Preferably, the belt means includes a plurality of belts disposed side by side, each belt being characterized by such modulus of elasticity. A motor driving a second pulley serves to rotate the wheel and tire assembly via the belt drive means trained about and extending between the first and second named pulleys.

Generally, it is an object of the present invention to provide an improved dynamic balancing machine particularly useful in balancing vehicle wheels at low speeds so as to effect the above noted economies.

It is another object of the present invention to provide a dynamic wheel balancing machine wherein a low energy, low noise drive system for such a machine permits the rate of rotation of the wheel to be sufficiently reduced to eliminate the need for a safety hood, permit use of a significantly smaller and lower rated drive motor, and a much less rigid and massive frame or base.

Another object of the invention is to provide a dynamic balancing machine characterized by means for smoothing out the starting and stopping of wheel rotation thereby smoothing out acceleration and deceleration forces whereby a less rigid base structure can be employed.

An additional object of the invention is to provide a dynamic balancing machine having means for sensing signals representative of unbalanced forces acting on a rotating body as well as the attendant noise from the system wherein means for rotating the body generates minimal noise thereby increasing the ratio of the amplitude of the unbalanced signals to that of the noise.

The foregoing and other objects of the invention will become more readily evident from the following detailed description of a preferred embodiment when considered in conjunction with the drawings.

FIG. 1 shows a diagrammatic perspective view of a dynamic wheel balancing machine according to the invention;

FIG. 2 shows a diagrammatic front elevation section view of the dynamic balancing machine as shown in FIG. 1, according to the invention; and FIG. 3 shows a diagrammatic perspective view with portions broken away for clarity of a drive system for rotating a wheel and tire assembly to be balanced.

DETAILED DESCRIPTION OF THE PREFERRED EMBODIMENT

In general, as shown in FIG. 1, a dynamic wheel balancing machine 10 includes a support base assembly 11. Assembly 11 supports means for rotating a wheel and tire assembly 12 and further includes means for sensing imbalance forces acting upon the wheel/tire assembly 12 while it rotates. The top 13 of machine 10 includes a number of pockets or cavities 14 for storing wheel weights (not shown) to be added to the inner and outer rims of the wheel 34. Base assembly 11 is of a sufficient height to dispose the foregoing construction at an appropriate working height above a support surface, such as the floor 16.

As shown in FIG. 2 a mounting hub formed with a flange 18 is disposed on the end of a rotatable axle 19. Axle 19 extends from an end of the bearing housing assembly 21 and rotates under the operation of a relatively low rated drive motor 31 of the order of one-/sixth horsepower or the like.

Base assembly 11, formed from relatively thin sheets of material, serves to define an enclosed body 23 for supporting the foregoing construction. The enclosure formed by base assembly 11 includes the upstanding walls 25 and a relatively light weight and readily removable floor panel 22 of suitable material, such as plywood, disposed within and adjacent the bottom end of body 23. A pair of spaced apart parallel elongate elements 24, welded to confronting sidewalls 25 of body 23, support panel 22.

A pair of mutually perpendicular cross braces 26, each disposed to extend between a pair of confronting walls 25, provides enough rigidity to the base even though body 23 employs relatively thin light weight material.

A pliant plastic bag 27 having a sealable flow passage 28 closed by means of a suitable cap 29 typically is shipped empty with the rest of the machine. However, upon arrival at its destination cap 29 can be removed and bag 27 filled with suitable fluid such as water, or in some cases, sand so as to provide an appropriate ballast for the low mass base assembly 11.

Bearing housing assembly 21 includes an elongated drive shaft or axle 19, and bearing means, such as the bearing block assemblies 32, 33 supporting shaft 19 for rotation.

Suitable sensor elements 36, 38 paired with passive supports 37, 39 carry bearing block assemblies 32, 33 with respect to a wall of the rectangularly shaped tubular housing 41. A further explanation of this type of sensing system appears in U.S. Pat. No. 4,449,407.

A suitable stationary baseplate 42 forms a top closure plate mounted onto body 23 to support housing 41 therefrom. Suitable fastening means (such as the nuts 43 and bolts 45) secures housing 41 to baseplate 42 so as to establish a fixed location for the axis of rotation of shaft 19. Drive motor 31 bolted to baseplate 42 establishes the location of the axis of rotation of its associated drive spindle 46. Spindle 46 carries a pulley 47 while shaft 19 carries a pulley 48 to rotate with shaft 19. Both pulleys 47, 48 lie in a substantially common plane whereby a plurality of elastic drive belts 49, 51, 52, 53 can be trained about and extend between the pulleys. Each of belts 49, 51–53 is sufficiently elastic to cause it to grip both pulleys 47, 48 when driven by motor 31 for rotating shaft 19 without need for additional tensioning means to be employed, such as those of a type acting against the belts.

Drive belts 49, 51–53 have a smooth exterior and a modulus of elasticity sufficient to provide substantially all tensioning of the belt means when trained about and between the pulleys whereby minimal noise will be generated within the system. Accordingly, a low energy drive can be used. Thus, the drive belts have a modulus of elasticity which provides an elongation of the order of at least 10% of their length, when driven by motor 31 whereby tensioning of these belts is derived substantially solely from the elasticity of the belts themselves.

The belts are preferably uniformly integrally continuous so as to be free of any joints therein and to provide a smooth exterior and uniformity therealong for minimizing the amount of noise in the signals sensed by sensors 36, 38.

Belts 49, 51–53 trained about pulleys 47, 48 form pulling and following reaches thereof depending upon the direction of rotation of drive spindle 46. For example, when belt 53 is driven by spindle 46 rotating in the direction of arrow 57, reach 53a can be considered the pulling reach and 53b the following reach. Accordingly, tesnion will be supplied primarily into reach 53a while limited slack will be introduced into reach 53b. Also, belt 53 has a modulus of elasticity such that when it is so driven by motor 31, reach 53a will stretch at least 10% of its length defined between pulleys 47, 48.

The exterior surface of each belt frictionally engages the pulleys with a grip proportional to the tension in the pulling reach of the belt. As thus arranged the drive belts significantly decrease the noise developed in the system so as to increase the ratio of the amplitude of the unbalanced signals to that of the noise thereby permitting reliable detection of unbalanced forces at relatively low speed.

Means for maintaining the belts axially on both pulleys comprises a plurality of four sheave portions 47a, 47b, 47c, and 47d formed about pulley 47 for engaging an associated one of belts 49, 51–53. Pulley 48 includes a smooth cylindrical sheave portion 48a bounded at its opposite ends by flanges 54, 56.

Thus, pulleys 47, 48 operate on fixed centers at a predetermined spaced relation from each other with no other tensioning means than the elasticity of the belts.

In operation, as the driving pulley 47 engages the relatively elastic belts they tend to grip their associated sheave portions 47a–47d thereby tending to stretch their related pulling reaches. For example, for belt 53, and assuming pulley 47 to be rotating in the direction of arrow 57, pulley 47 will stretch the pulling reach 53a at least 10% of its length defined between pulley 47, 48 until the inertia of the wheel and tire assembly 12 is overcome and rotation commences. Accordingly, the starting of rotation of wheel and tire assembly 12 will be somewhat more gradual and smoother than theretofore practiced and uses less energy.

When it is desired to stop rotation of wheel and tire assembly 12, motor 31 can be reversed whereby reach 53b becomes the pulling reach applying its tension to overcome the inertia of assembly 12 while reach 53a becomes the following reach. Accordingly, the elasticity of the belts serves to apply a varying force to the wheel and tire assembly to smooth out the starting and stopping of rotation so as to permit the use of a less rigid base.

While apparatus of the kind described can be operated with any one of the elastic belts, the use of a plurality of such belts permits the apparatus to continue in operation should one or more of the belts become worn and break. At that time it is not necessary to shut down the use of the equipment while waiting for delivery of a replacement belt.

It has been clearly established that use of the relatively highly elastic drive belts as disclosed above serves to eliminate much of the noise in a dynamic wheel balancing system. The elimination of the use of external tensioning means riding against the belt has been a major contribution toward enhancing the signal-to-noise ratio to a point where the wheel and tire assembly need not be rotated at great speed placing significant strain on the equipment. Since the speed of rotation of the wheel/tire assembly 12 can thereby be significantly reduced to a rate on the order of 40% of that previously believed necessary to achieve a proper signal-to-noise ratio, the drive energy may be reduced by approximately 80%. Thus, a one-sixth horsepower motor can be used where a one horsepower motor was previously required. Further, by deriving substantially all tensioning from the elastic drive belts both the upper and lower reaches of the belts remain freely supported and travel uninhibited between pulleys 47, 48.

From the foregoing it will be readily evident that there has been provided an improved light weight, low speed, low cost balancing machine particularly useful in balancing vehicle wheels.

What is claimed is:

1. A dynamic wheel balancing machine comprising a low mass support base, a drive shaft supported by said base for carrying a wheel and tire assembly, bearing means supporting said shaft for rotation, one end of said shaft being disposed and adapted to readily removably receive a wheel and tire assembly to be balanced, a first pulley fixed to rotate with said shaft, said first pulley being formed with a substantially cylindrical body for receiving drive belt means trained therearound, a drive motor, a second pulley driven by said motor, means for mounting said first and second pulleys on fixed centers in predetermined spaced relation to each other, means for sensing imbalance signals during rotation of said wheel, uniformly integrally continuous joint free readily stretchable drive belt means trained about and extending between said first and second pulleys to form pulling and following reaches thereof, the exterior surface of said belt means being smooth and serving to frictionally engage said pulleys with a grip proportional to the tension in the pulling reach of said belt means, said belt means having a modulus of elasticity providing an elongation of the order of at least 10% of its length defined between said first and second pulleys until the inertia of the wheel and tire assembly is overcome and rotation commences, said belt means decreasing the noise developed in the system so as to increase the ratio of the amplitude of said signals to that of the noise to permit reliable detection of unbalanced forces at relatively low speed, the elasticity of said belt means trained about said pulleys serving to tension said belt means.

2. A dynamic wheel balancing machine for rotating a wheel and tire assembly, said balancing machine comprising a low mass base formed of sheet material, a drive shaft and bearing means carried by said base for supporting said shaft for rotation, one end of said shaft being disposed and adapted to readily removably receive a wheel and tire assembly to be balanced during rotation with said shaft, a first pulley fixed to rotate with said shaft, a low power drive motor of the order of one-sixth horsepower, a second pulley driven by said motor, means for sensing imbalance signals and attendant system noise during rotation of said wheel, means for mounting said first and second pulleys substantially in a common plane and in predetermined spaced relation to each other, cyclic elastically stretchable lengthwise drive belt means trained about and extending between said first and second pulleys, said belt means being jointless and uniformly integrally continuous therealong, said belt means serving to increase the ratio of the amplitude of said signals to that of attendant noise sensed by said means for sensing imbalance signals to permit reliable detection of signals representative of unbalanced forces at relatively low speed.

3. A dynamic wheel balancing machine according to claim 2 in which said belt means comprises a plurality of elastically stretchable lengthwise belts disposed side by side and trained about and extending between said pulleys, each of said belts being capable by itself of operating said machine and having a modulus of elasticity sufficient to provide substantially all tensioning thereof when driven by said motor, the elasticity of said belts serving to apply varying force to said wheel and tire assembly to smooth out the starting and stopping of rotation thereof.

4. A dynamic wheel balancing machine for rotating a wheel and tire assembly comprising a support base,
   a drive shaft, bearing means supporting said shaft for rotation, one end of said shaft being disposed and adapted to readily removably receive a wheel to rotate therewith to be balanced, means for sensing imbalance signals and attendant system noise during rotation of said wheel, a first pulley fixed to rotate with said shaft, and said belt means serving to increase the ratio of the amplitude of said signals to that of the noise to enhance detection of unbalanced forces at relatively low speed, a drive motor, a second pulley driven by said motor, means for mounting said first and second pulleys in predetermined spaced relation to each other, a plurality of drive belts trained about and extending between said first and second pulleys to define pulling and following reaches thereof for each said belt, each said reach being freely supported between said pulleys to travel uninhibited therebetween, the exterior surface of said belts being smooth and serving to frictionally engage said pulleys with a varying grip proportional to the tension in said pulling reach to cause them to grip both said pulleys to rotate said shaft in response to operation of said drive motor, said pulling reach of said belts being stretched lengthwise by rotation of said second pulley to develop sufficient tension therein to cause said belts to maintain their grip about each pulley to rotate said shaft.

5. A drive system for a dynamic wheel balancing machine of a type having a low mass support base, comprising a drive shaft supported by the base for carrying a wheel and tire assembly, bearing means supporting the shaft for rotation, one end of the shaft being disposed and adapted to readily removably receive a wheel and tire assembly to be balanced, a first pulley fixed to rotate with the shaft, the first pulley being formed with a substantially cylindrical body for receiving drive belt means trained therearound, a drive motor, a second pulley driven by the motor, means for mounting the first and second pulleys on fixed centers in predetermined spaced relation to each other, and uniformly integrally continuous joint free drive belt means trained about and extending between the first and second pulleys to form pulling and following reaches thereof, the exterior surface of the belt means serving to frictionally engage the pulleys with a grip proportional to the tension in the pulling reach of the belt means, the belt means having a modulus of elasticity providing an elongation thereof of the order of 10% of its length for decreasing noise in the system so as to increase the ratio of the amplitude of said signals to that of the noise to enhance detection of unbalanced forces at relatively low speed, the modulus of elasticity of the belt means trained about the pulleys being sufficient to provide substantially all tensioning of the belt means when driven by said motor.

* * * * *